United States Patent [19]

Tsuruoka

[11] Patent Number: 5,272,701
[45] Date of Patent: Dec. 21, 1993

[54] CONTROL SYSTEM FOR MEDIATING SERVICE REQUESTS

[75] Inventor: Tetsumei Tsuruoka, Ichikawa, Japan

[73] Assignee: Fujitsu Limited, Kawasaki, Japan

[21] Appl. No.: 762,316

[22] Filed: Sep. 19, 1991

[30] Foreign Application Priority Data

Sep. 20, 1990 [JP] Japan .................................. 2-248780

[51] Int. Cl.$^5$ .............................................. H04J 3/02
[52] U.S. Cl. ..................... 370/85.2; 370/85.1;
340/825.03; 340/825.5
[58] Field of Search ............... 370/85.1, 85.2, 85.6,
370/58.1, 94.1, 94.3, 84, 109, 108, 85.4, 85.5;
340/825.5, 825.02, 825.51, 825.03; 375/122

[56] References Cited

U.S. PATENT DOCUMENTS

| | | | |
|---|---|---|---|
| 4,763,317 | 8/1988 | Lehman et al. | 370/58.1 |
| 4,885,743 | 12/1989 | Helbers et al. | 370/85.2 |
| 4,958,153 | 9/1990 | Murata et al. | 370/85.6 |
| 5,018,133 | 5/1991 | Tsukakoshi et al. | 370/85.6 |
| 5,128,937 | 7/1992 | Khalil | 370/85.6 |
| 5,132,966 | 7/1992 | Hayano et al. | 370/85.6 |

Primary Examiner—Douglas W. Olms
Assistant Examiner—Dang Ton

[57] ABSTRACT

A control system for mediating service requests simultaneously transferred from a plurality of service request sources, includes a plurality of evaluation function generating units each operatively connected to the corresponding service request source for receiving the service request therefrom. Each evaluation function generating unit calculates the evaluation function based on a service assignment quantity per unit time corresponding to each service request source, service time for past "n" times, and service waiting time for present and past "n" times. A comparison/judgment unit is operatively connected to all evaluation function generating units for comparing the evaluation function from the evaluation function generating units that simultaneously receive the service request, selecting the serviced request source that simultaneously inputs the service request based on the evaluation function, and outputting a mediation signal based on the selection.

11 Claims, 7 Drawing Sheets

CONTROL SYSTEM FOR MEDIATING SERVICE REQUESTS

BACKGROUND OF THE INVENTION

1. Field of the Invention

The present invention relates to a control system for mediating requests for service (below, service requests) simultaneously transferred from a plurality of service request sources. The present invention is advantageously used for a packet exchange system in a data communication system.

2. Description of the Related Art

There is a control system for mediating service requests in a data communication system, particularly, in a packet exchange system. This system assigns a few resources to a plurality of service request sources in accordance with evaluation of the priority for each service request source.

When a plurality of service request sources, for example, input ports of the packet exchange system, simultaneously require use of a particular resource, it is necessary to mediate the service requests from the service request sources in accordance with the priority order thereof. This mediation significantly influences the service rate for the service request source so that the result of the mediation also influence the throughput of the system. Accordingly, it is necessary to effectively mediate the service request in the data communication system, particularly, in the packet exchange system.

SUMMARY OF THE INVENTION

The primarily object of the present invention is to provide a control system for mediating service requests simultaneously transferred from a plurality of service request sources, which enables mediation for the service requests in accordance with the service assignment quantity in each service requests source.

Another object of the present invention is to provide an evaluation function generating unit enabling a suitable evaluation function for determining the priority order of the service request source.

In accordance with the present invention, there is provided a control system for mediating service requests simultaneously transferred from a plurality of service request sources, including:

a plurality of evaluation function generating units each operatively connected to the corresponding service request source for receiving the service request therefrom; and each evaluation function generating means calculating the evaluation function based on a service assignment quantity per unit time corresponding to each service request source, service time for past "n" times, and service waiting time for present and past "n" times; and comparison/judgment unit operatively connected to all evaluation function generating means for comparing the evaluation function from the evaluation function generating means that simultaneously receives the service request, selecting the service request source that simultaneously inputs the service request based on the evaluation function, and outputting a mediation signal based on the selection.

In the preferred embodiment, the evaluation function generating unit comprises: a setting register for determining the service assignment quantity or its reciprocal number; service time holding registers for holding the service time for past "n" times; waiting time holding registers for holding the waiting time for past "n+1" times; a first adder for obtaining sum of the service time held in all service time holding registers; a second adder for obtaining sum of the waiting time held in all waiting time holding registers; a third adder for obtaining a measuring time by adding the output of the first adding means to the output of the second adder; a multiplier for multiplying the output of the third adder by the output of the setting register; and a divider for dividing the output of the multiplier into the output of the first adder.

In another preferred embodiment, the evaluation function generating unit comprises: a common unit commonly provided for all evaluation function generating units; and an individual unit provided for each evaluation function generating unit. Further, the common unit comprises: a plurality of service selectors each inputting the group of the service time for selecting the service time for past "n" times; a plurality of waiting selectors each inputting the group of the waiting time for selecting the waiting time for past "n" times; a service assignment selector for selecting the service assignment quantity; a service time adder for adding all outputs of the service selectors; a waiting time adder for adding all outputs of the waiting selectors; a third adder for adding the output of the service time adder to the output of the waiting time adder; a multiplier for multiplying the output of the third adder by the output of the service assignment selector; a first divider for dividing the output of the multiplier by the output of the service time adder; and a second divider for dividing the output of the service assignment register into the output of the service time adder.

Still further, the individual unit comprises: a change component register for holding the output of the second divider; a evaluation function register for holding the output of the first divider; a fourth adder for adding the output of the change component register to the output of the evaluation function register every unit waiting time; and a selector for selecting the output of the first register and the output of the adder.

In still another embodiment, the comparison/judgment unit comprises a plurality of comparison units each sequentially comparing the evaluation function, and a plurality of selectors each selecting the evaluation function and selection signal based on the result of the above comparison. The comparison units and the selectors are connected by a tree structure in accordance with the number of the service request sources to output the mediating signal form the end selector of the tree structure.

In still another embodiment, the control system is used in a packet exchange system, each service request source corresponds to an input port, the service time corresponds to a packet length, and the waiting time corresponds to a queuing of the service request.

DESCRIPTION OF THE PREFERRED EMBODIMENTS

Before describing the preferred embodiments, an explanation will be given of a conventional art.

Figure 1:
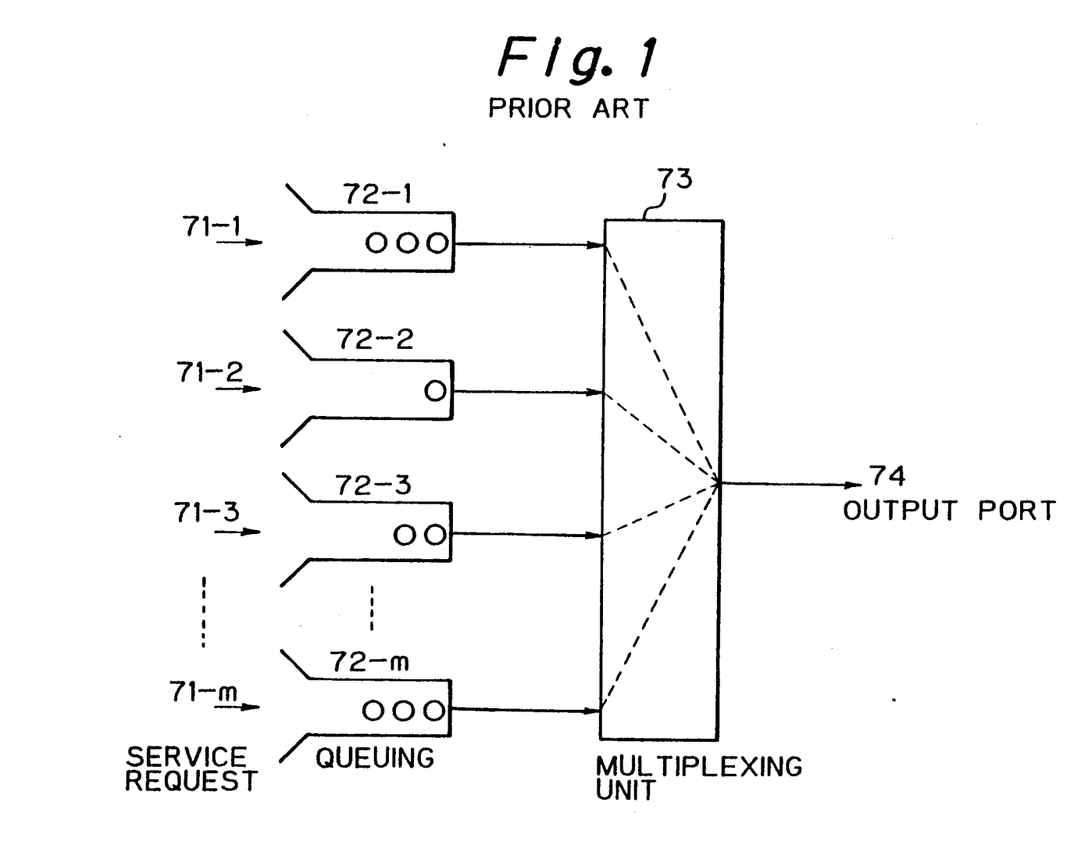
FIG. 1 is a schematic block diagram of a conventional packet exchange system.

FIG. 1 is a schematic block diagram of a conventional packet exchange system. In FIG. 1, 71-1 to 71-m denote input ports as service request sources, 72-1 to 72-m denote the queuing of service requests, 73 denotes a multiplexing unit, and 74 denotes an output port. The multiplexing unit 73 forms a plurality of paths between the service requests and the output ports, mediates requests of the packet transfer transferred from the input ports 71-1 to 71-m, and sends the packet to the output port 74.

The above packet exchange system has the following characteristics. That is, first, the data quantity and packet length at each input port 71-1 to 71-m are different from another one. This means that the service time and service opportunity for each input port 71-1 to 71-m are different from another one. Second, the service average time at each port 71-1 to 71-m indicates suitable data transfer quantity, i.e., suitable service quantity. Third, each input port 71-1 to 71-m has the queuing.

There are known mediation methods for the service request in the conventional art. There, for example, a fixed priority method, a round robin method, and a service waiting time method.

In the fixed priority method, the priority order of the service request source 71-1 to 71-m is previously determined. For example, the input port 71-1 has the highest priority, and the input port 71-m has the lowest priority. In this method, however, only particular input ports having the highest priority always receive good service, and other input ports having lower priority can not receive the service. That is, there is an imbalance of the service in this method.

In the round robin method, the priority order of the input port that just received the service is changed to the last priority order in the next mediation. Accordingly, any input port can receive an equal opportunity in the mediation of the service request. In this method, however, since the service time at each service request source is different from each other, each input port not always enjoys equal opportunity in the mediation of the service request.

In the service waiting time method, the input port having the longest waiting time has the highest priority. The waiting time means the time interval from the start of the service request until reception of the service. In this method, however, as well as the round robin, since the service time at each service request source is different from each other, each input port not always enjoys equal opportunity in the mediation of the service request.

A control system for mediating service requests according to the present invention is explained in detail hereinafter.

Figure 2:
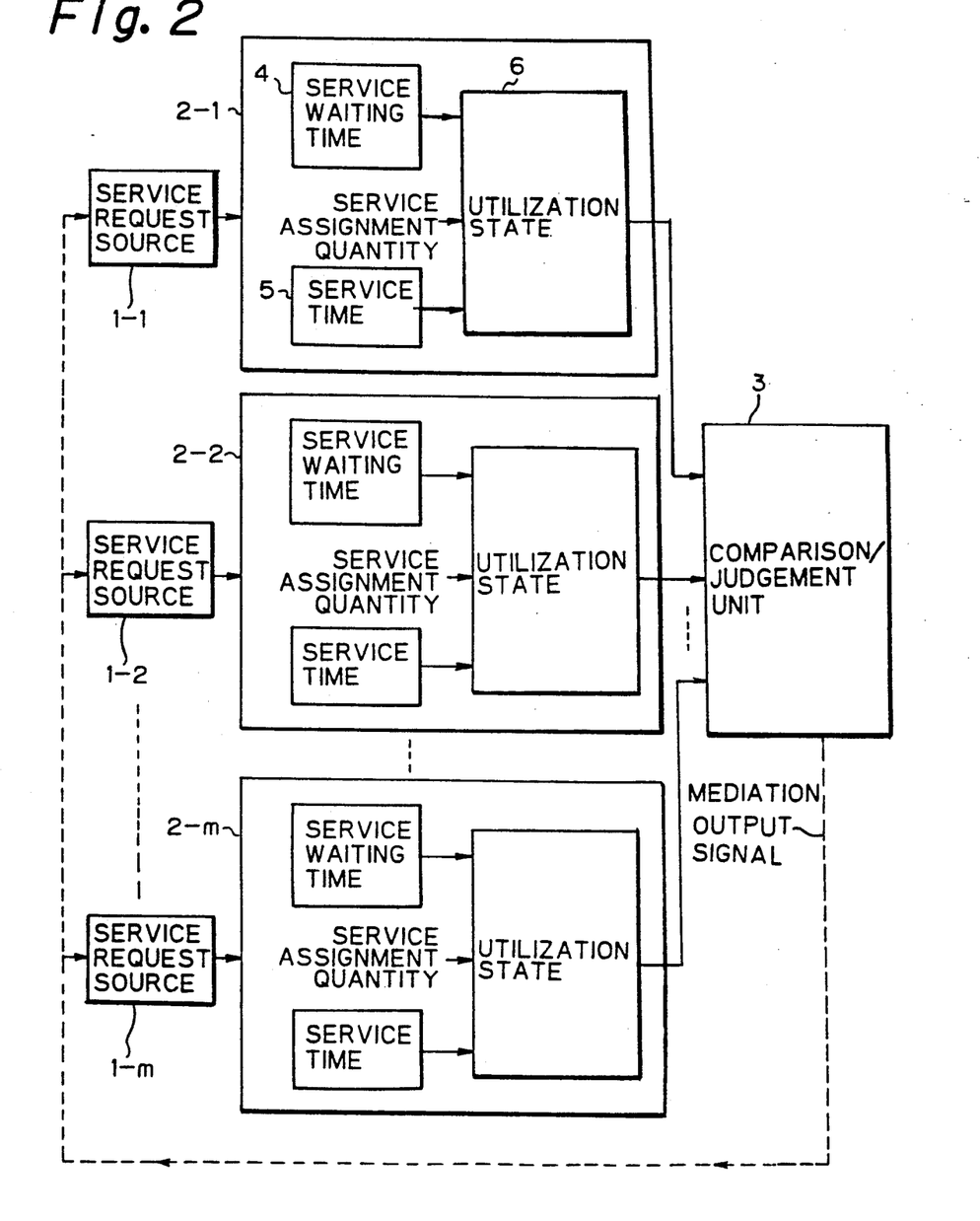
FIG. 2 is a basic block diagram of a control system for mediating service requests according to the present invention.

FIG. 2 is a basic block diagram of a control system for mediating service requests according to the present invention. In FIG. 2, 1-1 to 1-m denote service request sources, 2-1 to 2-m denote evaluation function generating units, and 3 denotes comparison/judgment unit. The evaluation function generating units 2-1 to 2-m are each provided for every service request source 1-1 to 1-m. The comparison/judgment unit 3 compares the evaluation functions and outputs the resultant data as a mediation signal for determining the service request source to be received next service.

In the evaluation function generating units 2-1 to 2-m, service assignment quantity per unit hour is determined for each service request source. Further, the evaluation function indicating utilization state of the service is obtained based on the waiting time 4 and the service time 5 at the past "n" times. In the comparison/judgment unit 3, the evaluation functions for the service request source that simultaneously requested the service are compared with each other, then, selects the service request sources.

Figure 3:
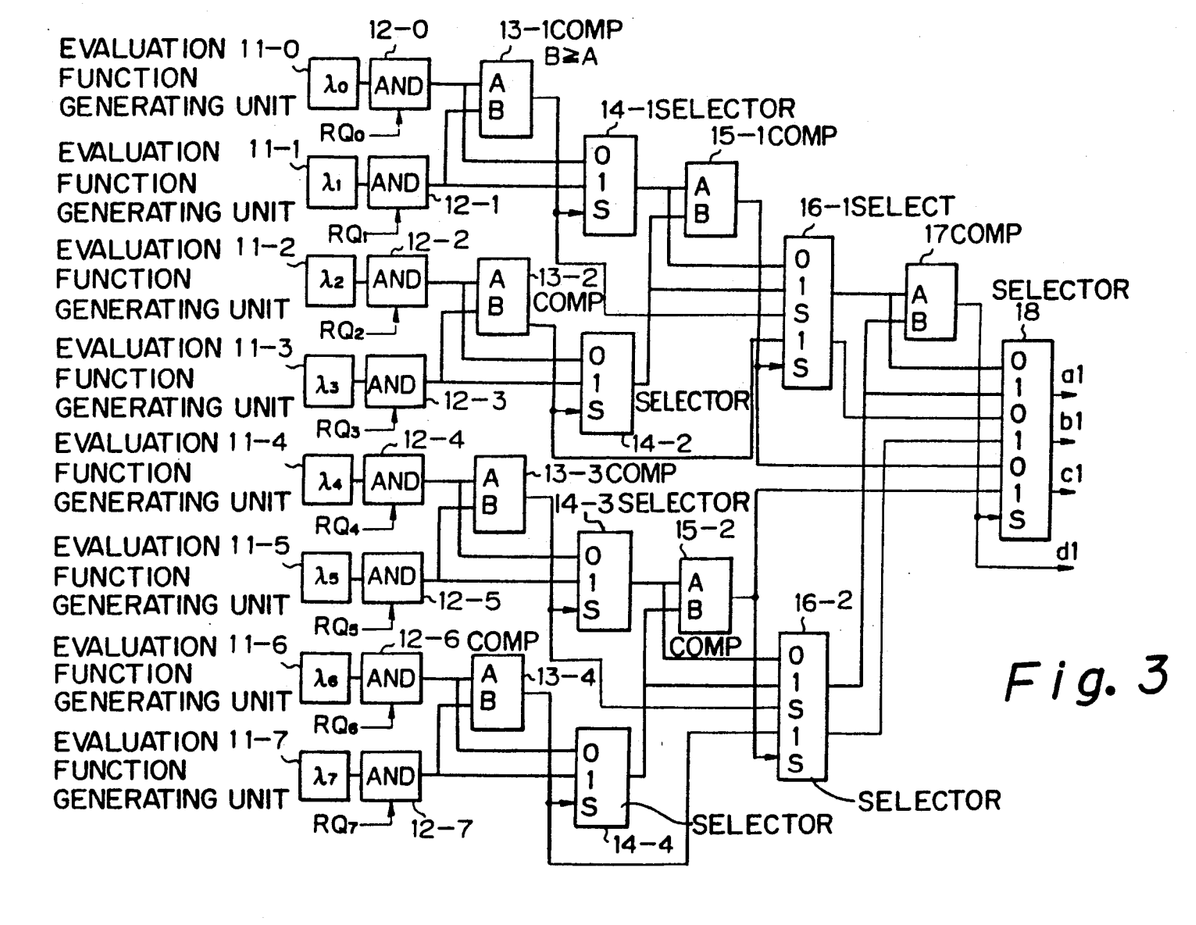
FIGS. 3 and 4 are block diagrams of a control system for mediating service requests according to an embodiment of the present invention.
Figure 4:
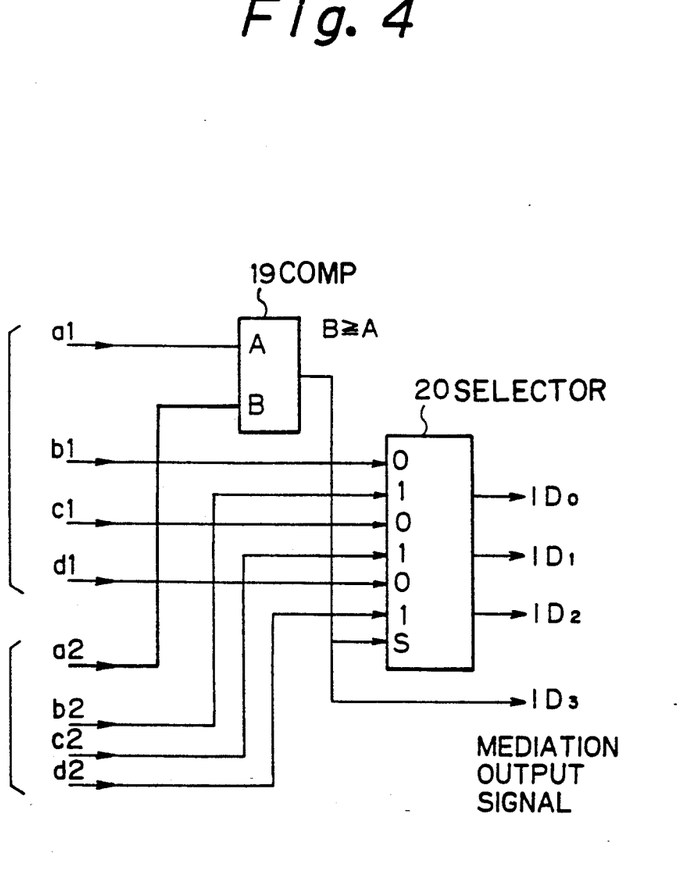

FIGS. 3 and 4 are block diagrams of a control system for mediating service requests according to an embodiment of the present invention. In FIG. 3 and 4, 11-0 to 11-7 denote the evaluation function generating units each corresponding to the evaluation function generating units 2-1 to 2-m in FIG. 2. $\lambda 0$ to $\lambda 7$ denote evaluation functions. 12-0 to 12-7 denote AND circuits, 13-1 to 13-4 denote comparison units, 14-1 to 14-4 denote selectors, 15-1 and 15-2 denote comparison units, 16-1 and 16-2 selectors, 17 denotes a comparison unit, 18 denotes a selector, 19 denotes a comparison unit, and 20 denotes a selector. Further, RQ0 to RQ7 denote service request signals. The comparison/judgment unit 3 in FIG. 2 is constituted by the AND circuits 12-0 to 12-7, the comparison units 13-1 to 13-4, 15-1 to 15-2, 17 and 19, and the selectors 14-1 to 14-4, 16-1, 16-2, 18, and 20 in FIGS. 3 and 4. In this case, another circuit having the same structure as shown in FIG. 3 is further included in the comparison/judgment unit 3. Accordingly, a2 to d2 in FIG. 4 denote outputs of another circuit. Accordingly, there are sixteen service request sources including another circuit. In FIG. 4, the selector 20 outputs mediation signal having four bits ID0 to ID3 each having one bit. As shown in the drawing, the comparison/judgment unit 3 is constituted by a plurality of comparison units and a plurality of selectors that have a tree structure, and the last selector 20 in FIG. 4 output the mediation signal.

In FIG. 3, the evaluation functions $\lambda 0$ to $\lambda 7$ correspond to the service request source. In the No. "j" service request source, the service assignment quantity BWj per unit hour is previously determined. Further, the waiting time before "i" times is set to Wji, and the service time before "i" times is set to Sji. The evaluation function $\lambda j$ of the service request source "j" is given as follows.

$$\lambda j = \frac{\Sigma Wji + \Sigma Sji}{\Sigma Sji} \times BWj \qquad (1)$$

The service time Sji can be obtained by counting the time receiving the service. The service time corresponds to the transfer time of the packet in the packet exchange system.

The waiting time Wji can be obtained by counting the waiting time until receiving the service. The waiting time corresponds to the waiting time of the packet of the queuing in the packet exchange system.

As is obvious from the formula (1), since the evaluation function $\lambda j$ corresponds to a reciprocal number of the service results $\Sigma Sji$ (actual transfer speed), the service request source having the largest evaluation function $\lambda j$ is selected. Accordingly, it is possible to determine the evaluation function by the reciprocal number "$1/\lambda j$".

In the comparison units 13-1 to 13-4, 15-1, 15-2, 17, and 19, A and B denote input terminals for inputting the evaluation function. When B is equal to or larger than A, each comparison unit outputs "1". In the selectors 14-1 to 14-4, 16-1, 16-2, 18, 20, each selector has input terminals "0", "1" and "S". Each terminal S is connected to a corresponding comparison unit. In this case, when S is "1", the input terminal "1" is selected. When S is "0", the input terminal "0" is selected.

For example, in the evaluation functions $\lambda 0$ to $\lambda 7$, assuming that the highest evaluation function is $\lambda 1$, since B is larger than A, the output of the comparison unit 13-1 is "1". Accordingly, since S is "1", the selector 14-1 selects "1" so that the evaluation function $\lambda 1$ is output therefrom. Further, since B is smaller than A, the output of the comparison 15-1 is "0" so that the input terminal "0" is selected in the selector 16-1. Further, the output "1" of the comparison unit 13-1 is input to the input terminal "0".

Further, since B is smaller than A, the output of the comparison unit 17 is "0". In the selector 18, the evaluation function $\lambda 1$ is output as the selected signal a1, the output "1" of the comparison 13-1 is output as the selected signal b1, the output "0" of the comparison 15-1 is output as the selected signal c1, and the output "0" is output as the output signal d1.

In FIG. 4, assuming that the evaluation functions $\lambda 8$ to $\lambda 15$ of another circuit (not shown) are smaller than the evaluation function $\lambda 1$, the output of the comparison unit 19 is "0" so that the input terminal S of the selector 20 is "0". Accordingly, the signals b1, c1 and d1 are selected in the selector 20. As a result, the mediation output signal ID0 is b1, the signal ID1 is c1, the signal ID2 is d1, and the signal ID3 is the output of the comparison unit 19. Accordingly, the mediation output signals ID3, ID2, ID1, ID0 are expressed by "0001" so that the service request source having the highest evaluation function receives the service.

As shown in FIGS. 3 and 4, since the comparison units and the selectors are constituted by only gate circuits, the mediation output signal can be easily obtained. In this case, although the delay time occurs for the mediation output signal in accordance with the number of the gate circuits, the delay time is negligible because it is very small.

Figure 5:
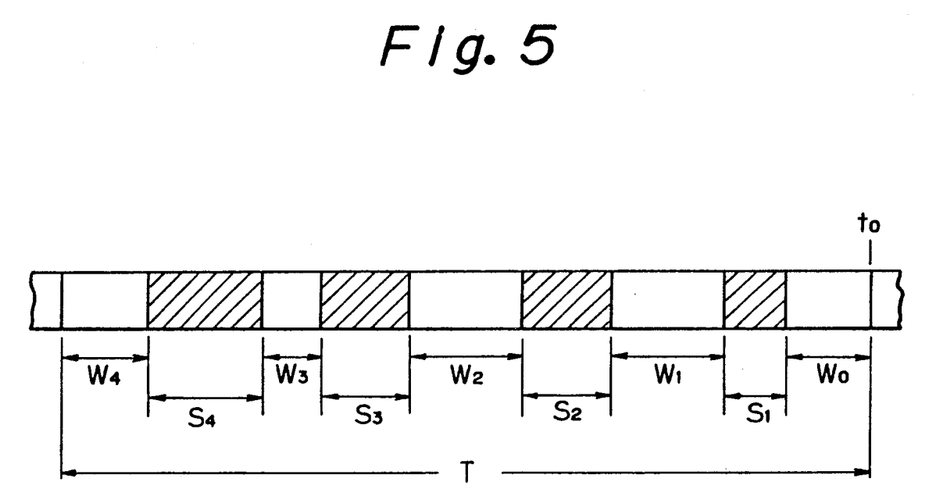
FIG. 5 is a view for explaining measuring time.

FIG. 5 is a view for explaining measuring time. In FIG. 5, "T" denotes a measuring time, W0 to W4 denote waiting time, and S1 to S4 denote the service time. Further, "t0" denotes a present time. The measuring time T can be expressed by the sum of the waiting time W0 to W4 and the service time S1 to S4. In this case, the service quantity can be expressed by the sum of the service time S1 to S4. In the packet exchange system, the packet transfer time (i.e., packet length) corresponds to the service time S1 to S4, and the transfer time of the packet from the input port to the output port corresponds to the waiting time W0 to W4.

Figure 6:
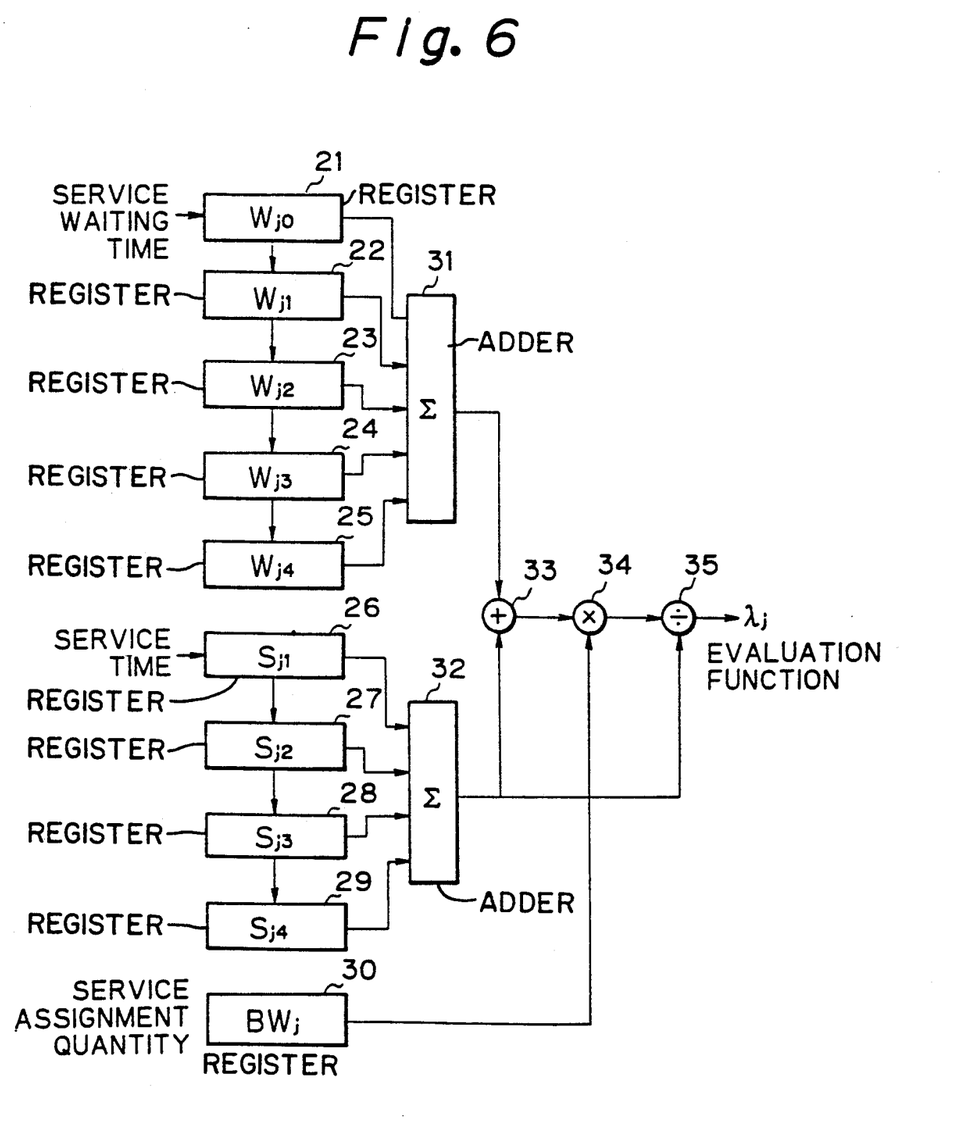
FIG. 6 is a schematic block diagram of an evaluation function generating unit according to an embodiment of the present invention.

FIG. 6 is a schematic block diagram of the evaluation function generating unit according to an embodiment of the present invention. In FIG. 6, 21 to 25 denote registers for holding the service waiting time, 26 to 29 denote registers for holding the service time, and 30 denotes a register for setting the service assignment quantity. Further, 31 denotes a second adder for obtaining the sum of the waiting time, 32 denotes a first adder for obtaining the sum of the service time, 33 denotes a third adder for obtaining the sum of the outputs of the first and second adders 31 and 32, 34 denotes a multiplier for multiplying the outputs of the third adders 33 by the service assignment quantity, and 35 denotes a divider for dividing the output of the multiplier 34 into the output of the first adder 32. The output of the divider 35 denotes the evaluation function. As is obvious from the drawing, the third adder 33, the multiplier 34, and divider 35 correspond to the formula (1).

Each waiting time (see, FIG. 5) is sequentially input to the register 21, and sequentially shifted to the registers 22 to 25 when the next waiting time is input. The second adder 31 calculates the sum of the waiting time from the time Wj0 until the time Wj4. Further, each service time (see, FIG. 5) is input to the register 26, and sequentially shifted to the registers 27 to 29 when the next service time is input. The first adder 32 calculates the sum of the service time from the time Sj1 to the time Sj4. The resultant data at the adder 33 corresponds to the measuring time T in FIG. 5.

The service assignment quantity BWj is set into the register 30. In this case, in the packet exchange system (see, FIG. 1), the service assignment quantity corresponds to a band assigned in accordance with the characteristics of the input ports 71-1 to 71-m. Further, the waiting time of the transmission packet at the queuings 72-1 to 72-m are added by the second adder 31, and the transmission time of the packet (i.e., service time) is added by the first adder 32.

Accordingly, when there are many input ports each having different speed, and when there are input ports having large actual traffic and input ports having small actual traffic, since it is possible to determine the service assignment quantity in accordance with the effective band, it is possible to realize the multipacket method in accordance with the band.

Figure 7:
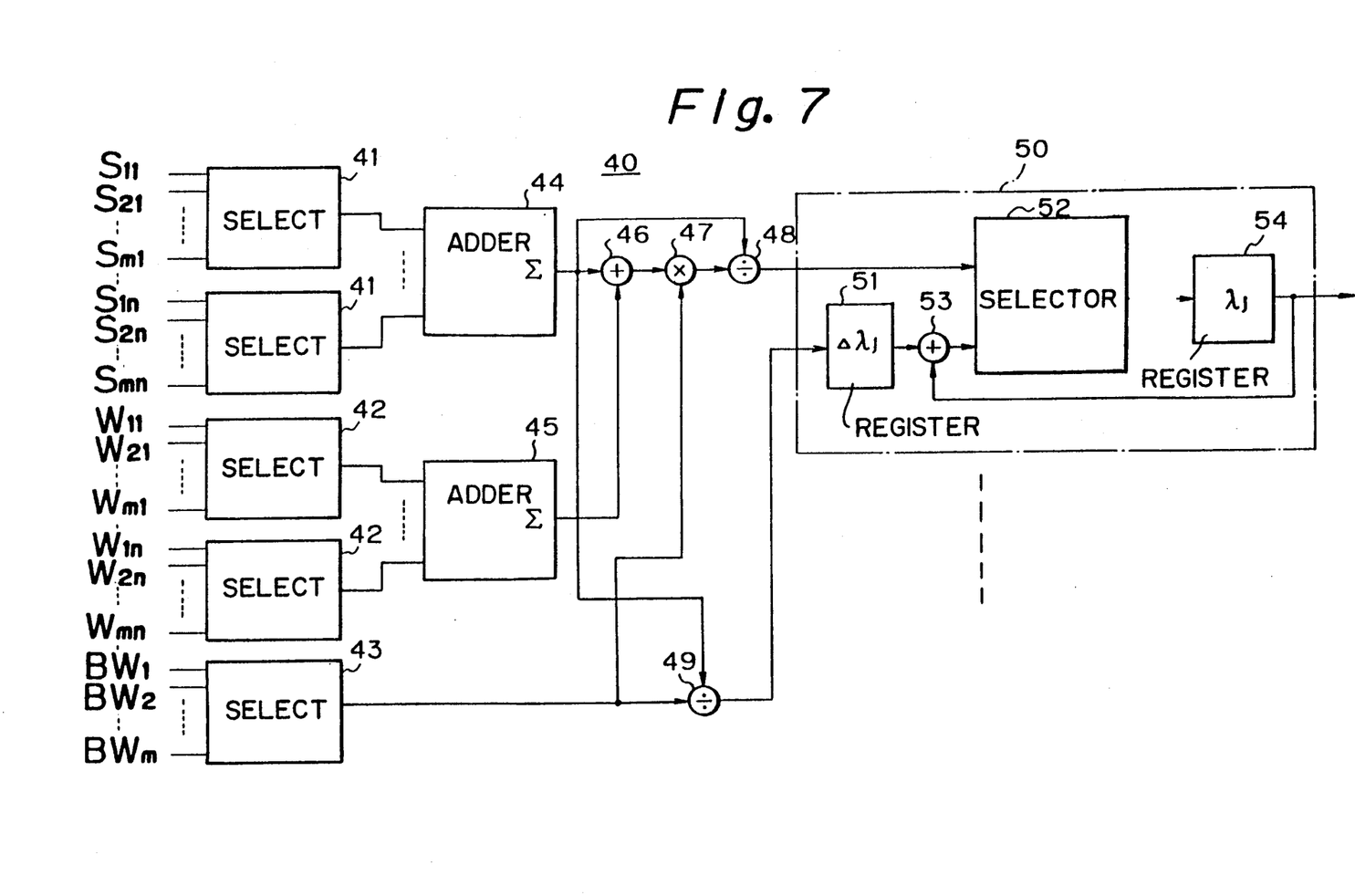
FIG. 7 is a schematic block diagram of the evaluation function generating unit according to another embodiment of the present invention.

FIG. 7 is a schematic block diagram of an evaluation function generating unit according to another embodiment of the present invention. In FIG. 7, 40 denotes a unit commonly provided for all input ports, and 50 denotes an individual unit provided for each input port. In the common unit 40, 41 to 43 denote selectors, 44 to 46 denote adders, 47 denotes a multiplier, and 48 denotes a divider. In the individual unit 50, 51 and 54 denote registers, 52 denotes a selector, and 53 denotes an adder.

The selectors 41 select the service time Sjl to Sjn of No. "j" service request source which now receives the service in the service time Sll to Smn. The adder 44 adds the selected service time. The selectors 42 select the waiting time Wjl to Wjn of No. "j" service request source which now receives the service in the waiting time Wll to Wmn. The adder 45 adds the selected waiting time. The selector 43 selects the service assignment quantity BWj of No. "j" service request source which now receives the service in the service assignment quantities BWl to BWm. The adder 46 adds the output of the adder 44 and the adder 45. 47 denotes a multiplier for multiplying the output of the adder 46 by the output of the selector 43, 48 denotes a divider for dividing the output of the multiplier 47 into the output of the adder 44, and 49 denotes a divider for dividing the output of the adder 43 into the output of the adder 44.

As mentioned above, the common unit 40 is commonly provided for all input ports, and the individual unit 50 is provided for each input port. According to this embodiment, it is possible to reduce the number of circuits considerably so that it is possible to reduce the manufacturing cost. That is, since the evaluation function $\lambda i$ and the service assignment quantity $BWj/\Sigma Sji$ are calculated at the end of the service, the adders 44 and 45, the multiplier 47 and the first and second dividers are commonly provided for all service request sources. This is explained in detail below.

When differentiating the formula (1), $$\partial \lambda j = \frac{BWj}{\Sigma Sji} \times \partial Wj0 \qquad (2)$$

Since $\partial Wj0$ is equal to $\partial t$ when the service request source "j" waits the service, the change component $\partial \lambda j$ ($=\Delta \lambda j$) of the evaluation function can be expressed by the time function $\partial t$ as follows.

$$\partial \lambda j (=\Delta \lambda j) = \frac{BWj}{\Sigma Sji} \times \partial t \qquad (3)$$

In the formula (3), "$BWj/\Sigma Sji$" is calculated in the divider 49 at the end of the service (i.e., completion of the transmission of the packet), and the resultant data $\Delta \lambda j$ is input to the register 51. Further, the evaluation function $\lambda j$ is calculated in the common unit 40 at the end of the service and stored in the register 54 of the individual unit 50 through the selector 52.

Accordingly, in the adder 53, the change component $\Delta \lambda j$ is added to the evaluation function $\lambda j$ every unit of the waiting time (i.e., $\delta t$) so that it is possible to obtain the evaluation function of each input port for the service waiting time.

Further, in the packet exchange system, when the service request is not required from the service request source, the queuing corresponding to that service request source is vacant. In this case, the evaluation function is newly calculated regardless of previous evaluation function. Accordingly, in the above case, the evaluation function is initialized by clearing the waiting time holding registers and the service time holding registers or loading a predetermined value to these registers.

I claim:

1. A control system for mediating service requests simultaneously transferred from a plurality of service request sources, comprising:
    a plurality of evaluation function generating means (2-1 to 2-m) each operatively connected to the corresponding service request source (1-1 to 1-m) for receiving the service request therefrom; and each evaluation function generating means calculating the evaluation function based on a service assignment quantity per unit time corresponding to each service request source, service time for past "n" times, and service waiting time for present and past "n" times; and
    comparison/judgment means (3) operatively connected to all evaluation function generating means for comparing the evaluation function from the evaluation function generating means which simultaneously received the service request, selecting the service request source that simultaneously inputs the service request based on the evaluation function, and outputting a mediation signal for determining the service request source to be received next service based on the selection.

2. A control system as claimed in claim 1, wherein said evaluation function generating means comprises:
    setting means (30) for determining the service assignment quantity or its reciprocal number;
    service time holding means (26 to 29) for holding the service time for past "n" times;
    waiting time holding means (21 to 25) for holding the waiting time for past "n+1" times;
    first adding means (32) for obtaining a sum of the service time held in all service time holding means;
    second adding means (31) for obtaining a sum of the waiting time held in all waiting time holding means
    third adding means (33) for obtaining a measuring time by adding the output of the first adding means to the output of the second adding means;
    multiplying means (34) for multiplying the output of the third adding means by the output of the setting means; and
    dividing means (35) for dividing the output of the multiplying means into the output of the first adding means.

3. A control system as claimed in claim 2, wherein said setting means comprises a register.

4. A control system as claimed in claim 2, wherein said service time holding means comprises a plurality of registers (26 to 29), and each register sequentially holding the service time shifted from the previous register.

5. A control system as claimed in claim 2, wherein said waiting time holding means comprises a plurality of registers (21 to 25), and each register sequentially holding the waiting time shifted from previous register.

6. A control system as claimed in claim 1, wherein said evaluation function generating means comprises:
    a common unit (40) commonly provided for all evaluation function generating means; and
    an individual unit (50) provided for each evaluation function generating means.

7. A control system as claimed in claim 6, wherein said common unit comprises:
    a plurality of service selectors (41) each inputting a group of the service time for selecting the service time Sj1 to Sjn of No. "j" service request source which now receives the service in the service time for past "n" times,
    a plurality of waiting selectors (42) each inputting a group of the waiting time for selecting the waiting time Wji to Wjn of No. "j" service request source which now receives the service in the waiting time for past "n" times,
    a service assignment selector (43) for selecting the service assignment quantity BWj of No. "j" service request source which now receives the service from service assignment quantities BW1 to WBm inputted into said service assignment selector,
    a service time adder 44 for adding all outputs of the service selectors (41),
    a waiting time adder (45) for adding all outputs of the waiting selectors (42),
    a third adder (46) for adding the output of the service time adder to the output of the waiting time adder,
    a multiplier (47) for multiplying the output of the third adder (46) by the output of the service assignment selector (43),
    a first divider (48) for dividing the output of the multiplier (47) by the output of the service time adder (44), and a second divider (49) for dividing the output of the service assignment selector (43) into the output of the service time adder (44).

8. A control system as claimed in claim 6, wherein said individual unit comprises:
- a change component register (51) for holding the output of the second divider (49),
- a evaluation function register (54) for holding the output of the first divider (48),
- a fourth adder (53) for adding the output of the change component register (51) to the output of the evaluation function register (54) every unit waiting time, and
- a selector (52) for selecting the output of the first register (48) and the output of the adder (53).

9. A control system as claimed in claim 1, wherein said comparison/judgment means comprises a plurality of comparison units each sequentially comparing the evaluation function, and a plurality of selectors each selecting the evaluation function and selection signal based on the result of said comparison; and the comparison units and the selectors being connected to each other by a tree like structure in accordance with the number of the service request sources to output the mediating signal from the last selector (20) at an output end of the comparison/judgment means.

10. A control system as claimed in claim 1, wherein the evaluation function is set to a predetermined value for the service request source instead of past "n" times service time and the waiting time.

11. A control system as claimed in claim 1, wherein the control system is used in a packet exchange system, each service request source corresponds to an input port, the service time corresponds to a packet length, and the waiting time corresponds to a queuing of the service request.

* * * * *